United States Patent

Dumoulin et al.

[11] 3,936,578
[45] Feb. 3, 1976

[54] METHOD OF RENDERING A SUBSTRATE NON-STICK TOWARDS TACKY SUBSTANCES BY COATING THE SUBSTRATE WITH AN ORGANOSILICON COMPOSITION

[75] Inventors: Jean Dumoulin; Louis Linguenheld, both of Rhone, France

[73] Assignee: Rhone-Poulenc S.A., Paris, France

[22] Filed: Dec. 7, 1973

[21] Appl. No.: 423,377

Related U.S. Application Data

[62] Division of Ser. No. 350,760, April 13, 1973, Pat. No. 3,821,154.

[30] Foreign Application Priority Data

Apr. 14, 1972 France............................ 72.13250

[52] U.S. Cl..... 428/429; 260/291 SB; 260/33.6 SB; 260/33.8 SB; 427/358; 427/387; 427/428; 428/443; 428/447; 428/457; 428/475; 428/480; 428/532; 428/537

[51] Int. Cl.².... B32B 15/08; B32B 17/10; B32B 27/06; B32B 27/28

[58] Field of Search... 260/33.6 SB, 33.8 SB, 29.1 SB; 117/124 F, 126 AB, 132 BS, 138.8 F, 153, 138.8 N, 143 A, 155 R, 101 ZA; 428/429, 443, 447, 457, 474, 480, 532, 537

[56] References Cited
UNITED STATES PATENTS

| | | | |
|---|---|---|---|
| 2,977,336 | 3/1961 | Blatz................................ | 117/138.8 F |
| 3,002,946 | 10/1961 | Thomas............................ | 117/132 BS |
| 3,046,160 | 7/1962 | Dengler............................ | 117/155 R |
| 3,202,542 | 8/1965 | Poje.................................. | 260/33.6 SB |
| 3,231,532 | 1/1966 | Modic............................... | 117/132 BS |
| 3,300,542 | 1/1967 | Hadlock........................... | 117/132 BS |
| 3,308,079 | 3/1967 | Haenni.............................. | 260/29.1 SB |
| 3,308,080 | 3/1967 | Haenni.............................. | 260/29.1 SB |
| 3,524,900 | 8/1970 | Gibbon............................. | 260/33.6 SB |
| 3,628,996 | 12/1971 | Weber............................... | 117/143 A |
| 3,671,484 | 6/1972 | Cooper............................. | 260/33.6 SB |

*Primary Examiner*—William D. Martin
*Assistant Examiner*—William H. Schmidt
*Attorney, Agent, or Firm*—Stevens, Davis, Miller & Mosher

[57] ABSTRACT

Sheets or films are rendered non-stick towards tacky substances by applying a coating composition containing specified quantities of (a) an $\alpha,\omega$-dihydroxydimethylpolysiloxane polymer, with a viscosity of at least 25,000 cPo at 25°C, containing at most 0.1% by weight of hydroxyl groups, (b) a dimethylpolysiloxane rubber terminated at each end of its chain by a unit of the formula $(CH_3)_3SiO_{0.5}$ or $(CH_3)_2CH_2=CHSiO_{0.5}$, with a viscosity of at least 1 million cPo at 25°C, (c) a crosslinking agent of the general formula $(Q)_{4-n}Si[(OCH_2CH_2)_pOQ']_n$ in which the symbol Q represents a hydrolysable radical selected from the group consisting of N,N-dialkylaminoxy, ketoniminoxy and aldiminoxy radicals, the symbol Q' represents a methyl or ethyl radical, the symbol n represents a number from 1 to 4 and the symbol p represents 1 or 2, (d) a tin, titanium or iron catalyst, (e) optionally a specified silicon containing vulcanisation accelerator and (f) an organic solvent are rendered more storage stable by incorporation of a hydroxylic methylpolysiloxane oil containing at least 3% by weight of hydroxyl groups, of viscosity between 3 and 400 cPo at 25°C, of the average general formula

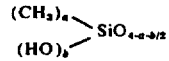

in which the symbol a represents a number from 1.7 to 2.3 and the symbol b represents a number from 0.1 to 1.

13 Claims, No Drawings

METHOD OF RENDERING A SUBSTRATE NON-STICK TOWARDS TACKY SUBSTANCES BY COATING THE SUBSTRATE WITH AN ORGANOSILICON COMPOSITION

CROSS-REFERENCES TO RELATED APPLICATIONS

This Application is a Divisional Application from Application Ser. No. 350,760 filed Apr. 13, 1973 and issued June 28, 1974 as U.S. Pat. No. 3,821,154.

FIELD OF THE INVENTION

The present invention relates to an organosilicon composition which is ready for use and can be employed, mainly on high-yield industrial machines, for the treatment of sheets and films made of the most diverse materials in order to render them non-stick towards tacky substances.

DESCRIPTION OF PRIOR ART

Compositions which make it possible to render substrates such as paper, cardboard, parchment and plastic films non-stick are already known. They generally contain, as base constituents, a hydroxylic dimethylpolysiloxane and a methylhydrogenopolysiloxane, (See for example French Patent Specification Nos. 1,165,551, 1,237,633, 1,443,657 and 1,595,718 and Published French Patent Application No. 2,055,462); however, these compositions have the disadvantage, once they are catalysed, of evolving smaller or larger amounts of hydrogen, at ambient temperature, and are thus rather unstable at ambient temperature and moreover, once they have been deposited on the substrates, they require long curing times which are unacceptable on high-yield machines.

However, other types of compositions contain, as the crosslinking agent, instead of methylhydrogenopolysiloxane, an organotriacyloxysilane (French Patent Specification No. 1,446,021 and Published Japanese Patent Application No. 70/32,775) or an organotrialkoxysilane (Published French Patent Application No. 2,054,202) or a methylpolysiloxane resin (French Patent Specification Nos. 1,308,462 and 1,319,697). Such catalysed compositions do not allow hydrogen to escape but nevertheless are not completely satisfactory to the users of industrial machines. Such machines operate at high speed and require not only high stability of the treating bath but also, as already mentioned, very short curing times, generally less than 20 seconds at about 120°–150°C. These two requirements are only satisfied simultaneously very rarely, and in particular, the stability of the compositions often leaves much to be desired and is too rigidly dependent on factors which are difficult to control such as the presence of traces of water in the solvents used.

The present invention provides an organosilicon composition comprising by weight:

a. 100 parts of an α-ω-dihydroxydimethylpolysiloxane polymer, with a viscosity of at least 25,000 centipoise at 25°C, containing at most 0.1% by weight of hydroxyl groups, b. 30 to 250 parts of a dimethylpolysiloxane rubber terminated at each end of its chain by a unit of the formula $(CH_3)_3SiO_{0.5}$ or $(CH_3)_2CH_2=CHSiO_{0.5}$, with a viscosity of at least 1 million centipoise at 25°C, c. 10 to 50 parts of a crosslinking agent of the general formula $$(Q)_{4-n}Si[(OCH_2CH_2)_pOQ']_n$$

in which the symbol Q represents a hydrolyzable radical selected from the group consisting of N,N-dialkylaminoxy, ketoniminoxy and aldiminoxy radicals; the symbol Q' represents a methyl or ethyl radical; the symbol n represents a number from 1 to 4 and the symbol p represents 1 or 2, d. 1 to 10 parts of a catalyst selected from the group consisting of organic derivatives of tin, chelates of titanium, chelates of iron, metal salts of aliphatic carboxylic acids and polymers possessing Ti-O-Sn chains, e. 0 to 10 parts of a vulcanisation accelerator of the general formulae:

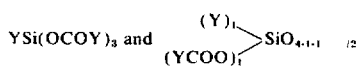

in which each symbol Y, independently represents an alkyl radical of 1 to 4 carbon atoms, a vinyl radical or a phenyl radical; the symbol 1 represents a number from 1 to 1.98 and the symbol 1' represents a number from 0.08 to 2, f. 500 to 5,000 parts of an organic solvent, and g. 5 to 30 parts of a hydroxylic methylpolysiloxane oil containing at least 3% by weight of hydroxyl groups, of viscosity between 3 and 400 centipoise at 25°C and of average general formula

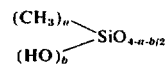

in which the symbol a represents a number from 1.7 to 2.3 and the symbol b represents a number from 0.14 to 1.

DESCRIPTION OF PREFERRED EMBODIMENTS

Component (a)

The α-ω-dihydroxydimethylpolysiloxane polymer (a) which can be used in the invention consists essentially of units of the formula $(CH_3)_2SiO$, but small amounts of trifunctional units of the formula $CH_3SiO_{1.5}$, comprising less than 2% of all of the units, can be included.

In order to provide coatings which are effective, both on the basis of non-stick character and on the basis of resistance to gumming, polymer (a) must be limited to rubbers of molecular weight ranging from 1 to several tens of millions of centipoise at 25°C and to viscous oils of viscosity greater than 25,000 centipoise at 25°C, and preferably 50,000, these being oils in which the OH content is less than 0.1% by weight, and preferably less than 0.05%. The preparation of this type of polymer is well known and is described, for example, in French Patent Specification Nos. 1,134,005 and 1,226,745.

Component (b)

The dimethylpolysiloxane rubber (b) blocked by units of the formula $(CH_3)_3SiO_{0.5}$ and $(CH_3)_2CH_2=CHSiO_{0.5}$ is a linear polymer consisting essentially of units of the formula $(CH_3)_2SiO$ and which can also contain less than 2% of trifunctional units of the formula $CH_3SiO_{1.5}$. It is used at the rate of 30 to 250 parts, and preferably 40 to 230 parts, per 100 parts of the oil (a). If quantities outside this range are used, the cured coatings are non-stick but can be removed by rubbing. The preparation of rubbers of this type, the viscosity of which ranges from 1 million to several million centipoise at 25°C, is described in French Patent Specification Nos. 1,108,764 and 1,132,048.

Component (c)

The crosslinking agent (c), of the general formula $Q_{4-n}Si[(OCH_2CH_2)_pOQ']_n$, can be a pure product or a mixture, its degree of purity depending on the method of production and on the physical properties of the crosslinking agent desired. Specific examples of hydrolyzable radicals represented by the symbol Q, include:

N,N-dialkylaminoxy radicals of formula $(CH_3)_2NO—$;

$C_2H_5(CH_3)NO—$; and $(C_2H_5)_2NO—$;

ketoniminoxy radicals of formula $(CH_3)_2C=NO—$; $C_2H_5(CH_3)C=NO—$; $C_3H_7(CH_3)C=NO—$; $C_3H_7(C_2H_5)C=NO—$;

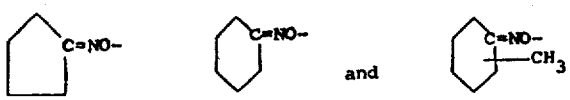

aldiminoxy radicals of formula $CH_3(H)C=NO—$; $C_2H_5(H)C=NO-$ and $C_3H_7(H)C=NO—$;

Specific crosslinking agents which can be used include:

$Si(OCH_2CH_2OCH_3)_4$; $(C_2H_5)_2NO-Si(OCH_2CH_2OCH_3)_3$
$[(C_2H_5)_2NO]_2Si[(OCH_2CH_2)_2OCH_3]_2$;
$[(C_2H_5)_2NO]_{1.5}Si(OCH_2CH_2OC_2H_5)_{2.5}$;
$C_2H_5(CH_3)C=NO-Si(OCH_2CH_2OCH_3)_3$;
$[C_2H_5(CH_3)C=NO]_{1.5}Si-(-OCH_2CH_2OCH_3)_{2.5}$;
$[(CH_3)_2C=NO]_2Si[(OCH_2CH_2)_2OCH_3]_2$;
$CH_3(H)C=NO-Si(OCH_2CH_2OCH_3)_3$ and
$[C_2H_5(H)C=NO]_{1.5}Si(OCH_2CH_2OC_2H_5)_{2.5}$.

The preparation of this silane does not present any major difficulties. Techniques which are now well known can be followed (for example as described in French Patent Specification Nos. 1,462,725, 1,506,185 and 1,506,842), but it is advisable to use, as the starting product, a chloropolyalkoxysilane of the general formula $Cl_{4-n}Si[(OCH_2CH_2)_pOQ']_n$, Q', n and p having the abovementioned meanings, which is brought into contact with the desired reagent which can be an N,N-dialkylhydroxylamine, a ketoxime or an aldoxime. In order to facilitate the reaction, it can be carried out in a solvent and in the presence of an agent which neutralises the hydrochloric acid generated, such as a tertiary amine, it being possible sometimes for an N,N-dialkylhydroxylamine to play this role.

This crosslinking agent (c) is incorporated into the compositions of the invention at the rate of 10 to 50 parts, and preferably 15 to 40 parts, per 100 parts of the polymer (a). Quantities outside these limits produce treating baths of mediocre stability or to coatings which do not resist abrasion well.

Component (d)

The curing catalyst (d) is preferably an organometallic derivative or a salt or complex of an organic compound and a metal, and can be selected from the following types:

(i) Organic derivatives of tin for example, organo-tin salts of carboxylic acids such as dibutyltin dilaurate or dioctyl-tin dilaurate, dibutyl-tin diacetate or dioctyl-tin diacetate, dibutyl-tin di-(2-ethyl-hexanoate) or dioctyl-tin di-(2-ethyl-hexanoate), dibutyl-tin succinate and dioctyl-tin maleate;

(ii) compounds of the general formula $T_2Sn(SCH_2COOT)_2$ in which each symbol T, may independently, represent a straight or branched chain alkyl radical with 3 to 20 carbon atoms, such as propyl, butyl, hexyl, octyl, isooctyl, decyl, dodecyl and octadecyl radicals; the preparation of such compounds is mentioned, for example, in Canadian Patent Specification No. 846,201 and French Patent Specification Nos. 1,477,892 and 1,488,631. By way of illustration, salts of the formula $(C_4H_9)_2Sn(SCH_2COOi-C_8H_{17})_2$ and $(C_8H_{17})_2Sn(SCH_2COOi\ C_8H_{17})_2$ can be employed;

(iii) cyclic compounds corresponding to the general formula:

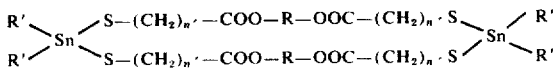

in which each symbol R, may independently represent a divalent hydrocarbon radical or a divalent radical consisting of divalent hydrocarbon radicals bonded by oxygen atoms or $—CO—$, $—COO—$ or $—CHOH—$ radicals, each symbol R' may independently represent a monovalent hydrocarbon radical and the symbol n' represents a positive integer. Specific divalent hydrocarbon radicals which can be used include alkylene radicals with 2 to 12 carbon atoms (such as $-CH_2-CH_2-$,

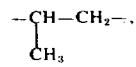

$-(CH_2)_8—$ and $(-CH_2)_{10}—$), or arylene radicals(such as phenylene and biphenylene); the monovalent hydrocarbon radical can be an alkyl radical with 1 to 20 carbon atoms (such as methyl, butyl, n-octyl, iso-octyl and octadecyl), an alkenyl radical with 2 to 10 carbon atoms (such as vinyl, allyl and 1-octene), or an aryl or aralkyl radical (such as phenyl, tolyl and benzyl). This type of compound can be prepared by bringing the organotin oxide $(R')_2SnO$, in a solvent medium, into contact with the dimercaptan $HS(CH_2)_n —COOR-OOC(CH_2)_n\ SH$. Specific examples of suitable cyclic compounds include:

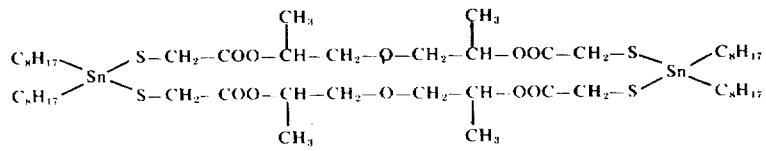

and

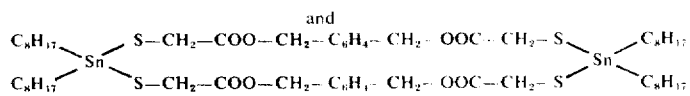

(iv) Chelates

Titanium chelates, prepared by reacting beta-diketones and beta-ketoesters, such as acetylacetone or ethylacetyl acetate, with an alkyl titanate [the alkyl radical having 3 to 10 carbon atoms, such as the propyl, isopropyl, butyl, pentyl, hexyl, 2-ethyl-hexyl, octyl and decyl radical] can be used. Details of the preparation and the structure of these coordination compounds are given in "The Organic Chemistry of Titanium" by R. Feld and P. L. Cowe, on pages 58 to 63. Ferric acetylacetonate can also be used.

(v) Metal salts of aliphatic carboxylic acids such as lead naphthenate, cobalt naphthenate, iron naphthenate, cobalt 2-ethyl-hexanoate, iron 2-ethyl-hexanoate, zinc 2-ethyl-hexanoate and tin 2-ethyl-hexanoate, can also be used.

(vi) Polymers with Ti-O-Sn chains, prepared by reacting alkyl titanates (the alkyl radical having 3 to 10 carbon atoms, as above) with organo-tin salts of aliphatic carboxylic acids can also be used. Such polymers are described in French Patent Specification No. 1,392,648 and U.K. Patent Specification No. 928,496.

These catalysts (d) are used at the rate of 1 to 10 parts, and preferably 2 to 8 parts, per 100 parts of the polymer (a). Amounts less than 1 part do not enable the compositions to cure correctly and amounts greater than 10 parts render the treating baths unstable.

Component (e)

The vulcanisation accelerator (e), which is optionally employed to reduce the curing time of the compositions and thus to increase the rate at which the coated paper passes through the drying furnaces, is a silane or polysiloxane carrying at least 3 acyloxy groups, of the general formulae $YSi(OCOY)_3$ and

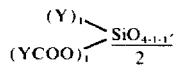

Specific examples of alkyl radicals with 1 to 4 carbon atoms represented by Y are methyl, ethyl, propyl and butyl radicals.

More specifically, the catalyst (e) can be a compound of formula: $CH_3Si(OCOCH_3)_3$, $CH_3Si(OCOCH_2CH_3)_3$, $CH_3Si(OCOCH_2CH_2CH_3)_3$, $CH_2=CHSi(OCOCH_3)_3$, $C_6H_5Si(OCOCH_3)_3$, $C_3H_7Si(OCOCH_3)_3$ or $(CH_3COO)_2CH_3Si[OSi(CH_3)_2]_yOSiCH_3(OCOCH_3)_2$ where $y = 0$ to 20.

The polysiloxanes (e) can be prepared by conventional techniques, for example by partial hydrolysis of silanes of the formula $YSi(OCOY)_3$ or by bringing these silanes into contact with an oil of low molecular weight of the general formula $HO(Y_2SiO)_xH$ in which the symbol X represents a number from 1 to 40; according to a variant, the products of partial hydrolysis can be rearranged with cyclic or linear diorganopolysiloxanes.

For 100 parts of the polymer (a), the amount of accelerator (e) must not exceed 10, and preferably 8, parts; above 10 parts, the stability of the treating bath becomes mediocre and the curing time of the compositions is not substantially improved.

Component (f)

Organic solvent (f) can be any of the common solvents which are non-toxic and inert towards other constituents of the compositions of the invention, and, for example, can be: an alkane or cycloalkane, which may or may not be chlorinated, such as hexane, heptane, octane, decane, dodecane, methylene chloride, tetrachloroethane, cyclohexane, methylcyclohexane or chlorocyclohexane;

a chlorinated alkene such as trichloroethylene or perchloroethylene;

or an aromatic hydrocarbon, which may or may not be chlorinated, such as toluene, xylene, cumene, tetralin, chlorobenzene or ortho-dichlorobenzene.

The solvent is used in the proportion of 500 to 5,000 parts, and preferably 1.000 to 4.500 parts, per 100 parts of polymer (a) so as to deposit, by means of modernmachines, 3 to 10 g of composition per $m^2$ of substrate to be treated, which corresponds approximately to 0.1 to 4 g of solids.

Component (g)

This component consists structurally of units of the formula $(CH_3)_3SiO_{0.5}$, $(CH_3)_2SiO$ and/or $CH_3SiO_{1.5}$ and has a viscosity of 3 to 400 centipoise at 25°C. This component can be prepared by known techniques (see for example French Patent Specification No. 1,077,230), for example by hydrolysis of dimethyldichlorosilane which may or may not be combined with trimethylchlorosilane and/or methyltrichlorosilane, in a solvent medium or without such a medium, followed by washing and neutralisation of the polymers obtained. For the hydrolysis, it is also possible to use dimethyldiacetoxysilane, which may or may not be mixed with trimethylacetoxysilane and/or methyltriacetoxysilane. It is, however, necessary for the oils so prepared to contain at least 3% by weight of hydroxyl groups.

For 100 parts of the polymer(a), 5 to 30 parts, and preferably 7 to 26 parts, of the polymer (g) are used. Below 5 parts, the compositions are markedly unstable and above 30 parts their curing times are too long.

The compositions of the invention can be prepared by simply mixing the constituents, at ambient temperature e.g. 10°–25°C introducing them in any order whatsoever; however, it is sometimes preferable to add to all or a portion of solvent (f) the polymers (a), (b) and (g), followed by the crosslinking agent (c), the catalyst (d) and optionally the accelerator (e) in such a way as to prevent the formation of solid products which would precipitate and would be difficult to dissolve thereafter.

The compositions so produced are stable on storage for more than 24 hours at ambient temperature. After being stored for 2 weeks, they can still be used to form perfect non-stick coatings. They are also stable for the entire period during which they are applied to the substrates to be treated, this being an application which takes place at ambient temperature e.g. 10°–25°C and in the atmosphere and which very often extends over a period of 10–90 hours. The compositions are deposited by conventional methods, for example with a roller or with a knife, but also by means of devices with which industrial machines are equipped such as the gravine roll, the smoothing bar and the system called "reverse roll".

Once they have been applied to the substrates, the compositions could crosslink to give non-stick coatings which are resistant to abrasion, by simply drying in air, but this technique is of little value on an industrial scale where means are always being sought to reduce the drying time, that is to say to treat the largest possible surface area in a given time without being prejudicial to the quality of the coatings. In order to achieve these results, the coated materials are passed through drying furnaces heated to a temperature of 70°–200°C and in which the pass times are 3 to 20 seconds.

The compositions of the invention can be applied to any materials which will subsequently be in contact with tacky, sticky, viscous or paste-like substances, so that the material can be removed without becoming attached to these substances. These materials can be, for example, diverse varieties of paper (such as Kraft paper which can be refined to any desired extent, glassine paper and sulphurised papers), cardboards, vegetable parchment, papers coated with polyethylene, sheets of regenerated cellulose such as cellophane, or of cellulose polyacetate, fabrics made of polyamides or of polyesters such as polyethylene terephthalate, sheets of plastic such as those of polyethylene and polypropylene, metal foils and fabrics of glass and asbestos fibres. Preferably, the substrate is a sheet or film of a paper, cardboard, parchment, cellulosic material, polyamide, polyester, metal, glass or asbestos. These materials, having been rendered non-stick by application of the composition of the invention, can then be used as spacers or as transfer papers or sheets as well as for the manufacture of bags for wrapping sticky materials such as sweets, pastry, crude rubbers, fused bitumen and waxes.

The following Examples illustrate the invention:

EXAMPLE 1.

A bath is used which contains (the parts being by weight):

130 parts of an α,ω-dihydroxydimethylpolysiloxane oil of viscosity 1 million centipoise at 25°C,
160 parts of a dimethylpolysiloxane rubber terminated at each end of its chain by a $(CH_3)_3SiO_{0.5}$ unit, of viscosity 50 million centipoise at 25°C,
29 parts of beta-methoxyethyl silicate $[Si(OCH_2CH_2OCH_3)_4]$,
4 parts of dibutyl-tin dilaurate,
5 parts of methyltriacetoxysilane,
3,660 parts of toluene and
12 parts of an α-ω-dihydroxydimethylpolysiloxane oil of viscosity 50 centipoise at 25°C, containing 13% by weight of hydroxyl groups.

In order to prepare this bath, the toluene, the rubber and the two organopolysiloxane oils are added first, with stirring, followed, after a homogeneous solution has been obtained, by the beta-methoxyethyl silicate, the tin salt and the methyltriacetoxysilane.

This bath is divided into 4 substantially equal portions, A, B, C and D, and the portions B, C and D are placed in closed containers. Portion A is immediately deposited, at the rate of 5 g/m², on one face of a Kraft paper (formed from a pulp refined to 78° Shopper) by means of a gravine roll mounted on an industrial paper treatment machine. The coating is simultaneously dried and cured by passing the coated paper through a furnace-tunnel heated to 150°C, the drying time which passes between the inlet and the outlet of the furnace being 5 seconds.

An adhesive tape of the sparadrap type is applied to the coated face of the paper and the force, in g/cm, necessary to detach the tape from the paper is measured on a tensometer. In order to make this measurement, a free end of the tape is folded back at 180° and this end is pulled at a speed of 25 cm/minute. An adhesive force of 2 g/cm is found.

Working under the same conditions as for the portion A, the portions B, C and D are used thereafter respectively 6 hours, 4 days and 8 days after the preparation of the bath. On opening the containers, they are limpid and lead to non-stick coatings of good quality, and it is noteworthy that the adhesive force of the adhesive tape on the face of the Kraft papers treated with these 3 portions is between 2 and 3 g/cm.

By way of comparison, the 12 parts of the α,ω-dihydroxydimethylpolysiloxane oil containing 13% of hydroxyl groups are dispensed with in the formulation of the bath, and the new bath is divided, as above, into 4 portions A', B', C' and D', the portion A' being used immediately and the others after having been left in a closed medium respectively for 6 hours, 4 days and 8 days.

It is found that, although the portion A' is suitable for the treatment of Kraft paper, the others, in contrast, are not; thus the portion B' is cloudy and very viscous and cannot be applied correctly, and as for the portions C' and D', they are completely gelled and thus cannot be used.

EXAMPLE 2

Baths are used, each of which comprises (the parts being by weight):

200 parts of an α-ω-dihydroxydimethylpolysiloxane oil of viscosity 100,000 centipoise at 25°C,
100 parts of a dimethylpolysiloxane rubber terminated at each end of its chain by a $(CH_3)_3SiO_{0.5}$ unit, of viscosity 10 million centipoise at 25°C,
40 parts of beta-methoxyethyl silicate,
5 parts of a metal catalyst described in more detail below,
3 parts of vinyltriacetoxysilane,
3,700 parts of methylcyclohexane and
18 parts of α-ω-dihydroxydimethylpolysiloxane oil of viscosity 40 centipoise at 25°C, containing 4% by weight of hydroxyl groups.

In order to prepare the treating bath, the rubber and the 2 organopolysiloxane oils are first incorporated into 3,500 parts of methylcyclohexane, and then the beta-methoxyethyl silicate, the metal catalyst and the vinyltriacetoxysilane are incorporated into the remaining 200 parts (of methylcyclohexane) and finally the 2 solutions are mixed. Six baths are prepared which differ from one another only in the nature of the metal catalyst.

Each bath is divided into 4 portions E, F, G and H; the E portions are used immediately and the F, G and H portions only after having been left in closed containers for 6 hours, 5 days and 10 days respectively. They are applied to the face of a Kraft paper coated with polyethylene (manufactured by extruding a polyethylene film of thickness 15 μ onto grey Kraft paper) by means of a smoothing bar mounted on an industrial treatment machine. After drying the coating deposited for 6 seconds at 120°C, the adhesion force of the tape of the sparadrap type is measured by the procedure described in Example 1. The results of these measurements, using each of the six baths, and the nature of the metal catalyst employed, are given in Table 1 below:

portions F', G' and H' cannot be used because either they are too viscous or they have gelled.

EXAMPLE 3

Three treating baths are used, each of which comprises (the parts being by weight):

100 parts of an α-ω-dihydroxydimethylpolysiloxane rubber of viscosity 5 million centipoise at 25°C,
200 parts of a dimethylpolysiloxane rubber terminated at each end of its chain by a $(CH_3)_2CH_2=CHSiO_{0.5}$

TABLE I

| METAL CATALYSTS | | PORTIONS | | | |
|---|---|---|---|---|---|
| | | E | F | G | H |
| 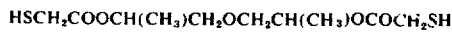 | (1) | 4 | 4 | 6 | 10 |
| n-C₈H₁₇\\Sn/SCH₂COO—iso—C₈H₁₇<br>n-C₈H₁₇/  \\SCH₂COO—iso—C₈H₁₇ | (2) | 2 | 4 | 4 | 8 |
| Polymer with →Ti—O—Sn← chains | (3) | 2 | 2 | 4 | 6 |
| [(CH₃)₂CHO]₂ Ti[O—C(CH₃)=CH—COCH₃]₂ | (4) | 4 | 6 | 10 | 12 |
| Fe[OC(CH₃)=CH—COCH₃]₃ | | 4 | 6 | 8 | 10 |
| (CH₃ CH₂CH₂CH₂—CHCOO)₃Fe<br>         \|<br>         C₂H₅ | | 4 | 4 | 6 | 8 |

1. This cyclic derivative of tin is prepared by heating under reflux for 10 hours 385 parts of a dimercaptan of the formula $$HSCH_2COOCH(CH_3)CH_2OCH_2CH(CH_3)OCOCH_2SH$$

with 520 parts of di-(n-octyl)-tin oxide dissolved in 400 parts of toluene.

2. This product is prepared as described in Example 3 of French Patent Specification No. 1,488,631.

3. This polymer is prepared as described in Example 2 of French Patent Specification No. 1,392,648.

4. This chelate of titanium is prepared by heating under reflux 284 parts of isopropyl titanate with 200 parts of acetylacetone, the isopropanol being removed as it is formed.

It is apparent from the table that the organic derivatives of tin, the chelates of titanium and iron, the iron salts of the carboxylic acid and the polymers with Ti-O-Sn bonds can be used as curing catalysts without having a detrimental effect on the stability of the baths and on the non-stick properties of the organosilicon coatings deposited.

By way of comparison, portions E', F', G' and H', are prepared from formulations of baths which do not contain the 18 g of the α-ω-dihydroxydimethylpolysiloxane oil containing 4% by weight of hydroxyl groups but are otherwise identical to portions E, F, G and H. Attempts are then made to deposit them on the paper coated with polyethylene according to the process mentioned for the portions E, F, G and H, the portion E' being deposited immediately and the portions F', G' and H' respectively after storage for 6 hours, 5 days and 10 days in closed containers. Only the portions E' can be applied and lead to acceptable results, but the other unit, of viscosity 2 million centipoise at 25°C,
20 parts of a crosslinking agent described in more detail below
5 parts of a dioctyl-tin diacetate,
4,000 parts of a mixture of alkanes of boiling points 93°C–114°C and
24 parts of hydroxylic methylpolysiloxane oil of viscosity 37.5 centipoise at 25°C, containing 6.7% by weight of hydroxyl groups, with a CH₃/Si ratio of 1.87, prepared by cohydrolysis of a mixture comprising 195 parts of methyltrichlorosilane and 1,125 parts of dimethyldichlorosilane dissolved in 1,320 parts of isopropyl ether by means of 2,050 parts of an 18% strength aqueous solution of ammonia, 950 parts of water and 32 parts of triethylamine.

In order to prepare these baths, the two rubbers and the organopolysiloxane oil dissolved in 3,900 parts of the mixture of alkanes are first introduced into a container equipped with a stirrer, followed by the crosslinking agent and the tin salt dissolved in the remaining 100 parts (of the mixture of alkanes). The three baths differ from one another in the nature of the crosslinking agent.

Each bath is divided into 4 portions, I, J, K and L; the portions I are used immediately and the portions J, K and L only after being stored in closed containers for 5 hours, 7 days and 14 days respectively. They are then deposited on one face of a sulphurised paper by means of the gravine roll mentioned in Example I. After drying and curing the coating deposited at 150°C for 6 seconds, the adhesive force of the adhesive tape of the sparadrap type is measured by the procedure described in Example I. The results of these measurements are given in the Table below.

TABLE II

| PORTIONS<br>CROSSLINKING AGENTS | | I | J | K | L |
|---|---|---|---|---|---|
| $(C_2F_5)_2NOSi(OCH_2CH_2OCH_3)_3$ | (1) | 3 | 3 | 9 | 12 |
| 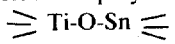$C=N-O-Si(OCH_2CH_2OCH_3)_3$ | (2) | 6 | 9 | 14 | 15 |
| $\left[\text{}C=NO\right]_{1.5}Si(OCH_2CH_2OCH_3)_{2.5}$ | (3) | 6 | 10 | 12 | 14 |

1. This silane is prepared by reacting 202 parts of tris(methoxyethoxy)-chlorosilane with a mixture comprising 62.5 parts of N,N-diethylhydroxylamine, 77.8 parts of triethylamine and 350 parts of toluene.

2. This silane is prepared by reacting 202 parts of tris(methoxyethoxy)-chlorosilane with a mixture comprising 61 parts of methylethylketoxime, 71.5 parts of α-picoline and 400 parts of toluene.

3. This silane is prepared by reacting 270 parts of a mixture of silanes of the average formula $Cl_{1.5}Si(OCH_2CH_2OCH_3)_{2.5}$ with a mixture comprising 128 parts of methylethylketoxime, 150 parts of α-picoline and 840 parts of toluene.

It is apparent from this table that the organosilicon compounds which carry aminoxy or ketoniminoxy groups, in addition to alkoxyalkoxy groups, bonded to the silicon atom, can be employed as crosslinking agents.

Portions I', J', K' and L', are prepared from baths which do not contain the 24 parts of the hydroxylic methylpolysiloxane oil containing 6.7% of hydroxyl groups but are otherwise identical to portions I, J, K. and L. The portions I' are used immediately and the portions J', K' and L' after being stored respectively for 5 hours, 7 days and 14 days. As in the case of the preceding examples, it is found that the portions J', K' and L' are not suitable because of too great an increase in viscosity and of formation of gelled products.

We claim:

1. A method of rendering a substrate non-stick towards tacky substances which comprises applying to the substrate an organosilicon composition comprising by weight:
   a. 100 parts of an α-ω-dihydroxydimethylpolysiloxane polymer, with a viscosity of at least 25,000 centipoise at 25°C, containing at most 0.1% by weight of hydroxyl groups,
   b. 3 to 250 parts of a dimethylpolysiloxane rubber terminated at each end of its chain by a unit of the formula $(CH_3)_3SiO_{0.5}$ or $(CH_3)_2CH_2=CHSiO_{0.5}$, with a viscosity of at least 1 million centipoise at 25°C,
   c. 10 to 50 parts of a crosslinking agent of the general formula $(Q)_{4-n}Si[(OCH_2CH_2)_pOQ']_n$ in which the symbol Q represents a hydrolyzable radical selected from the group consisting of N,N-dialkylaminoxy, ketoniminoxy and aldiminoxy radicals, the symbol Q' represents a methyl or ethyl radical, the symbol n represents a number from 1 to 4 and the symbol p represents 1 or 2,
   d. 1 to 10 parts of a catalyst selected from the group consisting of organic derivatives of tin, chelates of titanium, chelates of iron, metal salts of aliphatic carboxylic acids and polymers possessing $$\geq Ti-O-Sn \leq$$

chains,
   e. 0 to 10 parts of a vulcanisation accelerator of the general formulae $YSi(OCOY)_3$ and

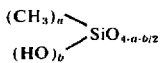

in which each symbol Y independently represents an alkyl radical of 1 to 4 carbon atoms, a vinyl radical or a phenyl radical, the symbol l represents a number from 1 to 1.98 and the symbol l' represents a number from 0.08 to 2,
   f. 500 to 5,000 parts of an organic solvent, and
   g. 5 to 30 parts of a hydroxylic methylpolysiloxane oil containing at least 3% by weight of hydroxyl groups, of viscosity between 3 and 400 centipoise at 25°C, of the average general formula:

$$\frac{(CH_3)_a}{(HO)_b}SiO_{4-a-b/2}$$

in which the symbol a represents a number from 1.7 to 2.3 and the symbol b represents a number from 0.14 to 1.

2. A method according to claim 1, wherein the hydroxylic methylpolysiloxane oil is an α,ω-dihydroxydimethylpolysiloxane oil of viscosity 50 centipoise at 25°C, containing 13% by weight of hydroxyl groups.

3. A method according to claim 1, wherein the hydroxylic methylpolysiloxane oil is an α-ω-dihydroxydimethyl-polysiloxane oil of viscosity 40 centipoise at 25°C, containing 4% by weight of hydroxyl groups.

4. A method according to claim 1, wherein the hydroxylic methylpolysiloxane oil is an oil of viscosity 37.5 centipoise at 25°C, containing 6.7% by weight of hydroxyl groups and with a $CH_3/Si$ ratio of 1.87.

5. A method according to claim 1, wherein the composition contains 7 to 26 parts by weight of the hydroxylic methylpolysiloxane oil per 100 parts by weight of component (a).

6. A method according to claim 1, wherein the viscosity of component (a) at 25°C is about 100,000 to 5 million centipoise.

7. A method according to claim 1, wherein the viscosity of component (b) at 25°C is about 2 million to 50 million centipoise and component (b) is present in an amount of 40–230 parts by weight per 100 parts by weight of component (a).

8. A method according to claim 1, wherein component (c) is $(CH_3OCH_2CH_2O)_4Si$, $(C_2H_5)_2NOSi(OCH_2CH_2OCH_3)_3$,

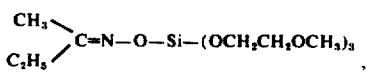

or

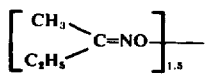

Si(OCH$_2$CH$_2$OCH$_3$)$_{2.5}$ present in an amount of 15–40 parts by weight per 100 parts by weight of component (a).

9. A method according to claim 1, wherein component (d) is dibutyl-tin dilaurate,

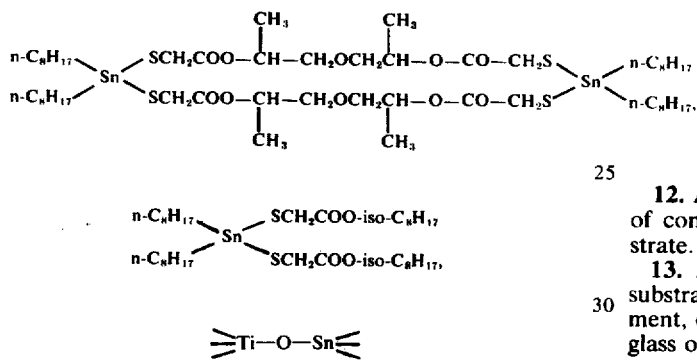

Polymer with chains, [(CH$_3$)$_2$CHO]$_2$ Ti[OC(CH$_3$)=Fe[OC(CH$_3$)=CH-COCH$_3$]$_3$ or

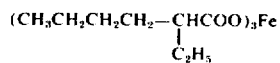

present in an amount of 2–8 parts by weight per 100 parts by weight of component (a).

10. A method according to claim 1, wherein component (e) is methyltriacetoxysilane or vinyltriacetoxysilane present in an amount up to 8 parts by weight per 100 parts by weight of component (a).

11. A method according to claim 1, wherein component (f) is toluene, methylcyclohexane or an alkane mixture of b.p. about 93°–114°C present in an amount of 1000–4500 parts by weight per 100 parts by weight of component (a).

12. A method according to claim 1, wherein 3–10 g of compositions is applied per square meter of substrate.

13. A method according to claim 1, wherein the substrate is a sheet or film of paper, cardboard, parchment, cellulosic material, polyamide, polyester, metal, glass or asbestos.

* * * * *